No. 891,203. PATENTED JUNE 16, 1908.
W. J. BREWER.
ANTIFRICTION WHEEL BEARING.
APPLICATION FILED MAR. 9, 1907.
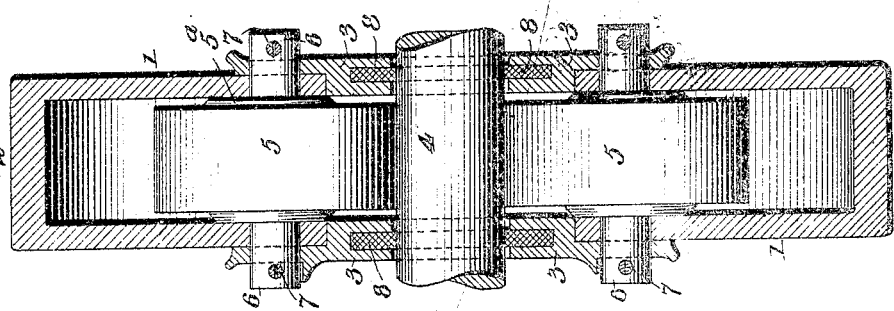
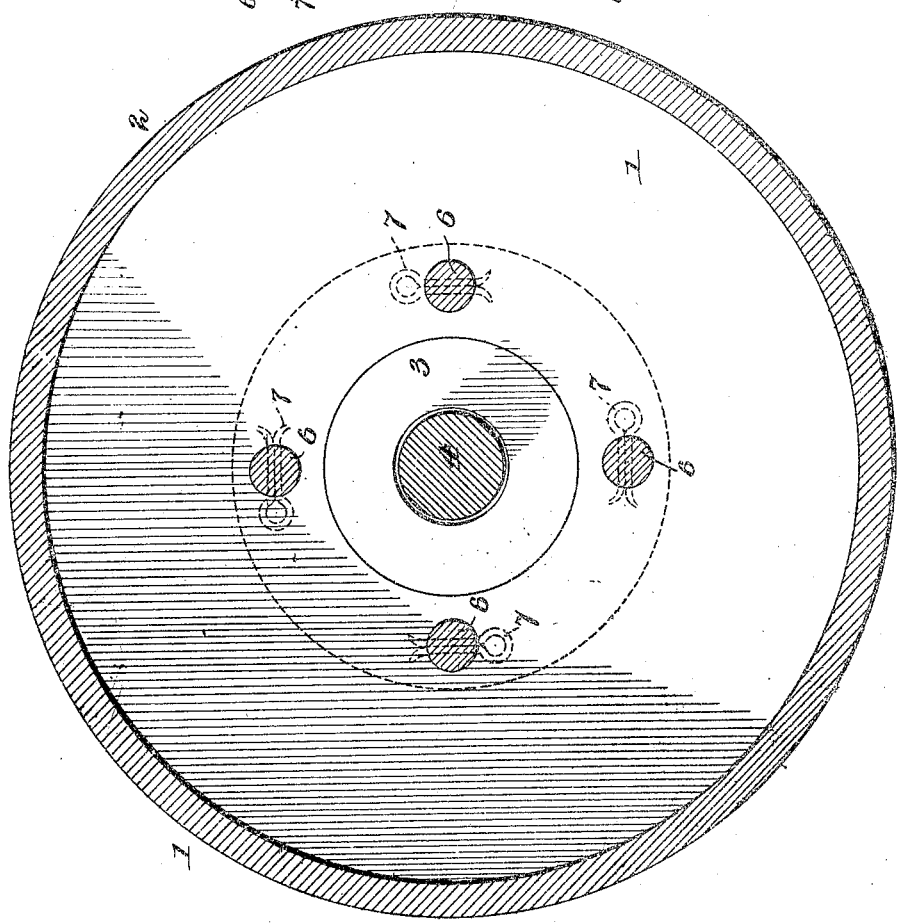
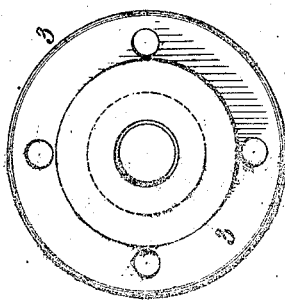
WITNESSES
Samuel E. Wade.
Amos H Hart
INVENTOR
WILLIAM J. BREWER
BY Munn & Co.
ATTORNEYS

UNITED STATES PATENT OFFICE.

WILLIAM JOHN BREWER, OF TRENTON, NEW JERSEY.

ANTIFRICTION WHEEL-BEARING.

No. 891,203.        Specification of Letters Patent.      Patented June 16, 1908.

Application filed March 9, 1907. Serial No. 361,486.

*To all whom it may concern:*

Be it known that I, WILLIAM J. BREWER, a subject of the King of England, and a resident of Trenton, in the county of Mercer and State of New Jersey, United States of America, have invented an Improvement in Antifriction Wheel-Bearings, of which the following is a specification.

My invention is an improvement in the class of wheels and pulleys which are provided with antifriction bearings, and the features of novelty are as hereinafter described, and illustrated in the accompanying drawings in which Figure 1 is a central transverse section of a wheel or pulley provided with my improvement. Fig. 2 is a section taken at right angle to the section indicated in Fig. 1. Fig. 3 is a face view of the inner side of one of the plates constituting an attachment of the wheel proper and embodying one of the chief features of my invention.

1 indicates the hollow body of the small wheel, the same having a flat periphery and it being cast or otherwise formed integral. The body 1 is provided with a central opening in each side and such opening is normally closed by a plate 3 whose construction and arrangement will be hereinafter described.

4 indicates an axle which is concentric with the periphery 2 of the wheel and passes through openings provided in the side plates 3 Around the axle 4 are arranged antifriction rollers or wheels 5, of which there are in this instance four, as indicated in Fig. 2; but three may be successfully employed. These rollers work in contact with the axle 4, and in fact constitute the sole bearing for the same. The peripheral or body portions of the rollers 5 are of considerably less width than the transverse width of the chamber of the wheel, and the rollers are provided with bosses 5ª which work in frictional contact with the sides of the wheel proper. An axle 6 also passes through each of the wheels 5 and also through openings provided in the body of the wheel 1 and likewise through coincident openings of the plates 3, spring pins 7 being inserted through openings in the ends of the axles for holding them in place. Thus there is in each side of the body of the wheel 1 a series of concentric openings adapted to serve as bearings for the axles of the rollers 5, and the plates 3, which normally close the large central openings in the sides of the wheel, are also provided with a series of concentric openings coincident with those in the wheel. Thus the side plates 3 serve as an additional bearing and support for each of the axles 6.

It will be noted that the side openings in the body of the wheel which are closed by the plates 3—as shown in Fig. 1—are of slightly greater diameter than the diameter of the antifriction rollers 5. By this means it is provided that any of the rollers 5 may be removed from the body 1 through either of the larger openings of the latter, it being only necessary to withdraw one of the pins 7 and slide the axle out of the particular roller which it is desired to remove. In this connection it will be understood that the wheel proper and axle 4 and sides 3 are first separated from each other.

The openings in the side plates 3 through which the axle 4 passes are made of such diameter that the axle does not come in contact with the plates, the sole bearing for the axle being, as before indicated, provided by the concentric wheels 5. It will be seen that the plates 3 have an interior circular projection which is adapted to fit neatly in the side openings of the body 1 of the wheels or pulleys so that the side plates are held firmly in place as regards radial movement, or movement toward or from the periphery of the wheels.

Each of the plates 3 is provided with an annular elastic packing 8, the same being inserted and held in annular slots or recesses provided in the edges of the plates which surround the axle, these elastic washers 8 work in contact with the axle and serve as means to hold within the chamber of the wheel a lubricating agent, such as for example, graphite.

By means of its flat periphery 2 the wheel 1 may be used as such for small trucks or large vehicles.

What I claim is:

1. The improvement comprising a hollow body having large central side openings, and a series of three or more smaller openings arranged concentrically around the larger ones, antifriction rollers and axles therefor whose bearings are in said smaller openings, and side plates applied to, and closing, the larger openings of the body and having a series of openings which coincide with those of the body, whereby the plates are adapted to serve as additional means for supporting the axles of the rollers; and devices applied to said axles for holding them in place together with the side plates, substantially as described.

2. The improvement described, comprising a hollow body 1 having large central side openings, a series of antifriction rollers arranged concentrically, and axles therefor as described, side plates which close the said side openings and are provided with a series of smaller openings coinciding with those of the body and adapted to receive, and serve as additional bearings for, the axles of the rollers; means for securing the axles together with the side plates, the rollers being of less diameter than the large central openings of the body whereby they are adapted to be removed therefrom, as and for the purpose specified.

WILLIAM JOHN BREWER.

Witnesses:
S. D. OLIPHANT, Jr.,
RICHARD S. WILSON.